US008603284B2

(12) United States Patent
Stephens et al.

(10) Patent No.: US 8,603,284 B2
(45) Date of Patent: Dec. 10, 2013

(54) FLUID DISPENSING SUBASSEMBLY WITH COMPLIANT FILM

(75) Inventors: Terrance L. Stephens, Molalla, OR (US); John R. Andrews, Fairport, NY (US); John S. Moore, Beaverton, OR (US); James M. Stevenson, Tualatin, OR (US)

(73) Assignee: Xerox Corporation, Norwalk, CT (US)

( * ) Notice: Subject to any disclaimer, the term of this patent is extended or adjusted under 35 U.S.C. 154(b) by 677 days.

(21) Appl. No.: 12/829,019

(22) Filed: Jul. 1, 2010

(65) Prior Publication Data

US 2010/0263791 A1 Oct. 21, 2010

Related U.S. Application Data

(62) Division of application No. 12/194,494, filed on Aug. 19, 2008, now Pat. No. 7,766,463.

(51) Int. Cl.
*B32B 38/04* (2006.01)
*B32B 37/02* (2006.01)

(52) U.S. Cl.
USPC .............................. 156/256; 156/60; 156/250

(58) Field of Classification Search
USPC .......................................... 156/256; 347/44
See application file for complete search history.

(56) References Cited

U.S. PATENT DOCUMENTS 6,457,222 B1 * 10/2002 Torii et al. .................... 29/25.35
6,536,879 B2 * 3/2003 Ito et al. .......................... 347/71
6,592,216 B2 * 7/2003 Slenes et al. .................... 347/94
6,663,232 B2 * 12/2003 Kondo et al. ................... 347/71
2004/0125176 A1 * 7/2004 Kobayashi et al. ............ 347/68
2005/0122586 A1 * 6/2005 Adachi et al. ................. 359/487
2005/0162047 A1 * 7/2005 Torii et al. ..................... 310/358
2006/0192828 A1 * 8/2006 Ohira et al. .................. 347/100
2007/0058004 A1 * 3/2007 Enomoto et al. ................ 347/68
2007/0195143 A1 * 8/2007 Andrews .......................... 347/93
2008/0138925 A1 * 6/2008 Andrews et al. ................ 438/53
2008/0143796 A1 * 6/2008 Hong et al. ..................... 347/85
2010/0238237 A1 * 9/2010 Seki ................................ 347/71
2012/0262522 A1 * 10/2012 Hays ............................... 347/93

* cited by examiner

*Primary Examiner* — Philip Tucker
*Assistant Examiner* — Vicki Wu
(74) *Attorney, Agent, or Firm* — Marger Johnson & McCollom PC

(57) ABSTRACT

A fluid dispensing subassembly, includes a first set of plates including a diaphragm to be operated on by a transducer, a second set of plates including at least one manifold plate to direct ink to an aperture plate forming an exterior surface of the second set of plates, and a polymer compliant film arranged in between the first and second sets of plates to attach the first and second sets of plates together to form the fluid dispensing subassembly. A method of manufacturing a fluid dispensing subassembly includes forming a first structure of at least a diaphragm and a gap plate adjacent to at least one side of a polymer compliant film, the gap plate further including an air gap integrally formed within the gap plate, forming a second structure of at least a manifold body sealed on at least one side by the polymer compliant film, placing the polymer compliant film between the first and second structures, and using the polymer compliant film as an adhesive to attach the first and second structures of plates together, forming a fluid dispensing subassembly.

9 Claims, 5 Drawing Sheets

FLUID DISPENSING SUBASSEMBLY WITH COMPLIANT FILM

CROSS-REFERENCE TO RELATED APPLICATIONS

This is a Division of U.S. patent application Ser. No. 12/194,494, filed Aug. 19, 2008 now U.S. Pat. No. 7,766,463, entitled FLUID DISPENSING SUBASSEMBLY WITH COMPLIANT FILM, the disclosure of which is herein incorporated by reference in its entirety.

BACKGROUND

Some fluid dispensing assemblies use transducers or actuator to cause the system to dispense fluid. The actuators may be piezoelectric actuators, microelectromechanical (MEMS) actuators, thermomechanical actuators, thermal phase change actuators, etc. The actuators generally cause some sort of interface with the fluid to move to generate pressure in the fluid that in turn causes the fluid to move through an aperture to a receiving substrate.

In addition to causing the assembly to dispense or dispel fluid, the actuators may also create pressure oscillations that propagate into the fluid supply. These pressure oscillations give rise to droplet position errors, missing droplets, etc.

One example of such a fluid dispensing system is an ink jet printer. Generally, ink jet printers include some sort of transducer or actuator that cause the ink to move out of the print head through a jet, nozzle or other orifice to form a drop on a print surface. Pressure oscillations result in position errors, affecting the accuracy of the resulting print, missing ink droplets, affecting the color density of the print, and color density bands in prints.

DETAILED DESCRIPTION OF THE EMBODIMENTS

Some fluid dispensing assemblies include a local ink supply and a fluid dispensing subassembly. The fluid dispensing subassembly may be viewed as having several components. First, the driver component may consist of the transducer, such as a piezoelectric transducer, that causes the fluid to exit the subassembly, the diaphragm upon which the transducer operates, and the body plate or plates that form the pressure chamber. Second, an inlet component consists of the manifold body that direct the fluid from the manifold toward the pressure chamber. Next, the outlet component directs the fluid from the pressure chamber to the aperture. Finally, the aperture itself dispenses fluid out of the printhead.

One example of a fluid dispensing subassembly is a jet stack in a printhead, the jet stack typically consisting of a set of plates bonded together. In this example, the driver would operate to cause the fluid to exit the jet stack through the aperture plate. The inlet would direct the fluid from the manifold towards the pressure chamber, and the outlet would direct the ink from the pressure chamber to the aperture plate. In the example of a jet stack, the aperture would dispense fluid out of the jet stack and ultimately out of the print head.

Figure 1:
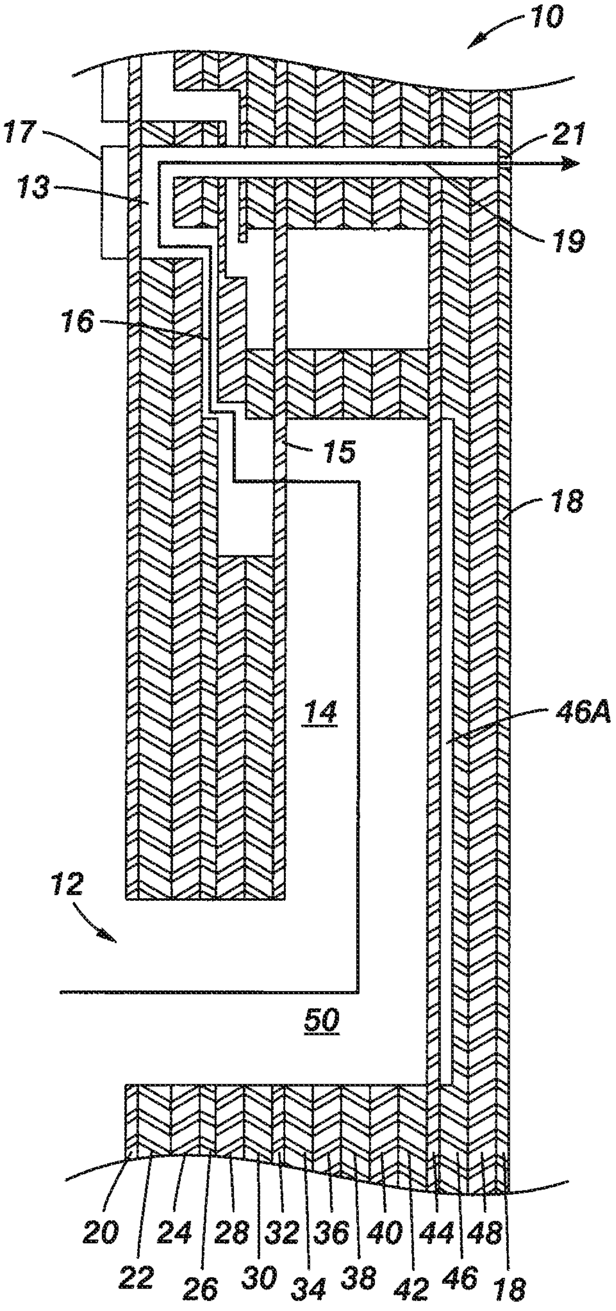
FIG. 1 shows an example of a fluid dispensing subassembly having a steel compliant wall and air gaps.

FIG. 1 shows an example of a jet stack in a printhead. The jet stack 10 consists of a set of plates bonded together in this example and will be used in the discussion. It should be noted that this is just an example and no limitation to application or implementations of the invention claimed here. As will be discussed further, the terms ‘printer’ and ‘printhead’ may consist of any system and structure within that system that dispenses fluid for any purpose. Similarly, while a jet stack will be discussed here to aid in understanding, any fluid dispensing subassembly may be relevant. The fluid dispensing subassembly or fluid dispensing body may be comprised of a set of plates, as discussed here, a molded body that has the appropriate channels, transducers, and apertures, a machined body, etc. As aspects of the embodiments include additional structures inside the jet stack than just the plates, the set of plates may be referred to as the fluid dispensing body within the fluid dispensing subassembly.

The jet stack receives ink from a reservoir (not shown) through a port 12. The ink flows through the manifold 14 having a compliant wall 44 and an air space 46A opposite the manifold, through a particle filter 15 and into to an inlet 16. The inlet directs liquid to a pressure chamber 13. When an actuator or transducer 17 activates, it causes the diaphragm plate 20 to deflect, and causes ink to flow through the outlet 19 and exit an aperture 21 on the aperture plate 18. The ink drops exiting the aperture form a portion of a printed image. The aperture plate 18 and the compliant wall 44 on the interior of the jet stack will typically be steel plates. The part of the ink path that includes the inlet, the pressure chamber, actuator, outlet, and aperture is referred to as the “single jet”.

The actuator, in addition to providing the pressure that forces ink out the apertures, also directs pressure oscillations back through the inlet and into the manifold. The pressure oscillations from several jets attached to the manifold can lead to larger amplitude pressure oscillations that then in turn influence the ejection of drops in the same and other drop ejectors. The manifold pressure oscillations lead to print defects such as banding and missing or misplaced drops.

The series or set of plates are etched, stamped or otherwise manufactured to form the various channels, chambers and features of the jet stack. In this example, the stack consists of a diaphragm plate 20; body plate 22; a separator plate 24; an inlet plate 26; separator plates 28 and 30; a particle filter plate 32; and manifold plates 34, 36, 38, 40, and 42; a compliant wall plate 44, a plate 46 providing an air space adjacent to the compliant wall, an aperture brace 44 and an aperture plate 18.

When the jet stack is made up from a series of bonded metal plates, a thin, stainless steel plate can form one wall of the manifolds internal to the jet stack. An air gap is generally provided next to the stainless steel plate opposite to the manifold to dissipate the pressure oscillations. The ability of the manifold wall to flex is called compliance and is thus referred to as a compliant wall. An example of this approach is demonstrated by US Patent Application Publication No. 2002/0196319.

However, because of it’s high Young’s modulus (~200 GPa), the bonded stainless steel wall generally does not provide enough compliance, resulting in a need for larger compliant regions in the jet stack and more complex manifold shapes. This structure generally includes acoustic filters built into the jet stack using etched plates to form chambers inside the jet stack. An example of this approach is demonstrated in U.S. Pat. No. 6,260,963.

In addition, the brazing process during which the plates of the jet stack are bonded together may cause dimensional changes in the compliant wall that do not occur in the remaining plates of the jet stack. This leads to bowing of the compliant wall and in increase in its effective stiffness, reducing its effectiveness to attenuate acoustic energy.

In order to achieve the necessary level of compliance with the relatively stiff, stainless steel compliant wall, the manifold width has to be increased. The wide manifold design requirements use up area and provide limitations on the jet density, among other constraints.

Figure 2:
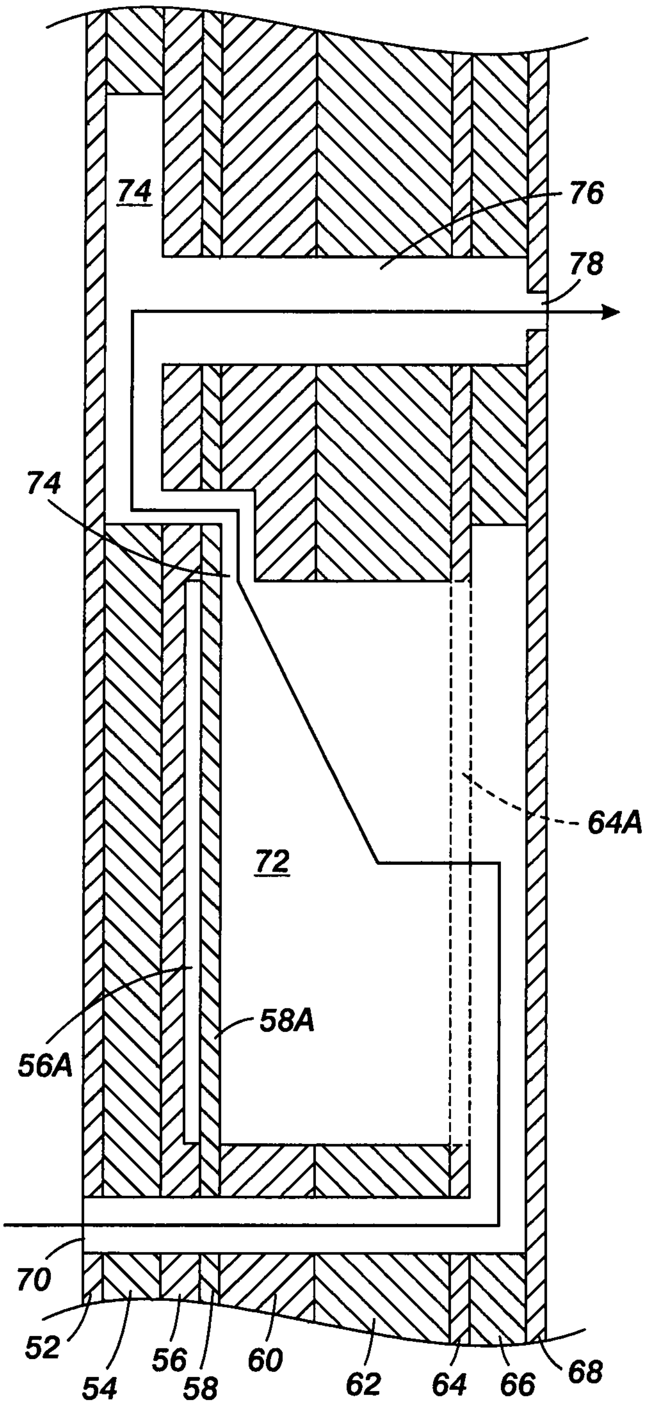
FIG. 2 shows an embodiment of a fluid dispensing subassembly having a polymer compliant film.

FIG. 2 shows a cross-sectional view of a jet stack having a polymer compliant wall inside the jet stack. The ink enters the ink inlet 70 and passes through the jet stack plates. The ink passes through a 'rock screen' or particulate filter 64A that protects the jets from particles. The ink enters the manifold 72, which is sealed on one side by the compliant wall 58A having an air space 56A in the gap plate 56 on the opposite side of the ink for acoustic attenuation. The ink then enters the body chamber 74 from which it is forced out the aperture 78 through the body outlet 76 by activation of the transducer, not shown.

The polymer compliant film may provide the adhesive to attach the two sets of plates together to form the jet stack. As discussed above, several different materials may be used for the compliant film. If the compliant film is to act as the adhesive between the two sets of plates, the compliant film may consist of double-sided tape, or may have multiple layers.

A core layer provides the characteristic compliance to attenuate the acoustic energy that causes the pressure differentials in the ink supply. One example may be a thin, thermoset polyimide material, in addition to the materials mentioned above. The outer layers surround the core and may consist of the adhesive layers. Thermoset and thermoplastic adhesives can be use. The thermoset adhesives may be one of several materials, including acrylic, silicone, epoxy, and bismaleimide. Thermoplastic adhesives can include thermoplastic polyimide, polyetherether ketone, and others. The film may be cut by a laser or other means to form any ports for ink and air flow needed in the jet stack configuration. These films are generally available in a range of thicknesses from less than 12.5 microns to greater than 200 microns. Typically, films of approximately 25 microns are preferred since they provide sufficient strength and ease of handling and while still providing a high level of compliance to as to enable efficient attenuation of the acoustic energy in the manifold even with narrow manifolds on the order of 1 mm wide.

As will be discussed with regard to FIG. 4, the manufacture of this jet stack may involve 'dividing' the jet stack into two sets of plates or structures and then using the compliant film to adhere the two structures together. An example of such a division is shown in FIG. 3.

Figure 3:
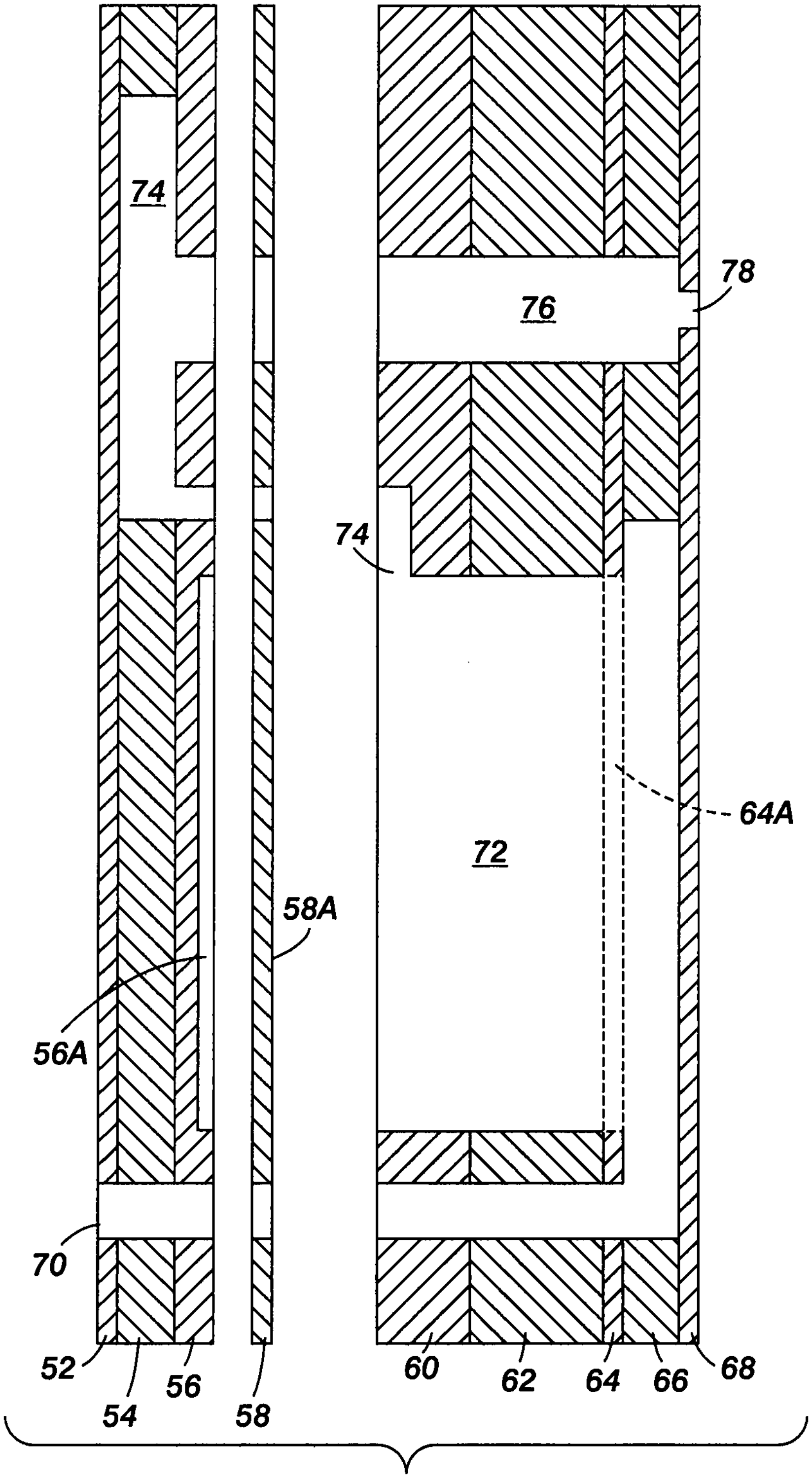
FIG. 3 shows an embodiment of a fluid dispensing subassembly from a cross-sectional view.

FIG. 3 shows a division of the jet stack to have a first set of plates, here consisting of the diaphragm 52, the body plate 54 that forms the pressure chamber 74, and the spacer 56 that forms the gap 56A. A second set of plates would then consist of the first manifold, plate 60, the second manifold plate 62, the rock screen plate 64 having particulate filter 64A, the inlet plate 66, and the aperture 68. These two sets of plates are then adhered together into the jet stack using the compliant film 58.

The division of plates depends in large part upon the placement of the compliant film. In this particular example, the compliant film resides adjacent the spacer 56 on the side of the manifold closest to the diaphragm. In this embodiment, the spacer provides the air space for the flexing of the compliant film, and the manifold relies upon the compliant film to seal one side of the manifold. In other embodiments, the spacer and/or the manifold may reside in different configurations, e.g., on the side of the manifold closest to the apertures, and those configurations are considered to be included in the scope of the claimed invention. These different configurations could be included within the same jet stack, when for example, manifolds for different fluids are located within different layers of the jet stack.

Figure 4:
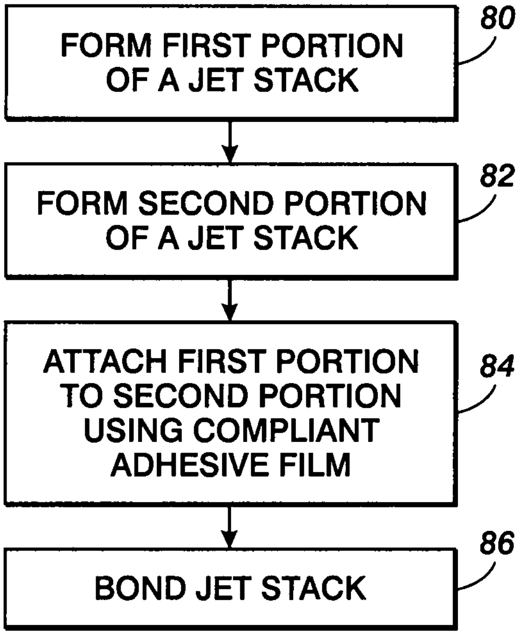
FIG. 4 shows a flowchart of an embodiment of a method of manufacturing a fluid dispensing subassembly having a polymer compliant film.

FIG. 4 shows a flowchart for manufacture of the jet stack. Once the division point of the jet stack into two parts has been decided upon, each portion of the jet stack is formed into a set of plates at 80 and 82. This results in two sets of plates, a first set of plates and a second set of plates. It must be noted that one portion of the jet stack or the other may only consist of one plate. For ease of discussion, this embodiment will be included in the term 'set of plates.'

The jet stack is then bonded at 86. As the compliant film is also adhesive, the bonding may occur under pressure. In one embodiment, the jet stack could be bonded in a conventional press at temperatures less than 200 degrees Celsius at 30 pounds per square inch for approximately 30 minutes. This would result in a fluid-tight jet stack with an internal polymer compliant ink. Testing has shown that the polymer compliant film is resistant to ink, preventing it from interfering with the ink flow in the jet stack.

With the addition of the internal compliant film to the jet stack, the jet stack now has the ability to attenuate acoustic energy from the actions of the transducers. This reduces the pressure fluctuations in the ink supply and contributes to better performance. Issues such as jet drop out are reduced, if not eliminated.

Figure 5A:
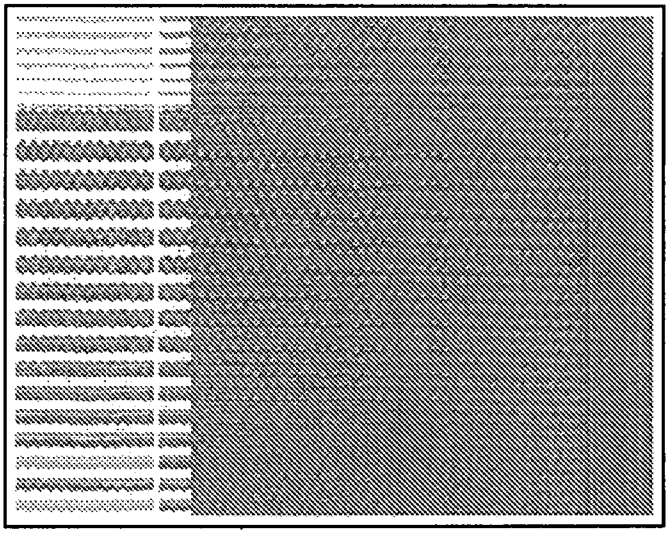
FIGS. 5A and 5B show a comparison between two images formed by fluid dispensing subassemblies with a stainless steel compliant wall and a polymer compliant film.
Figure 5B:
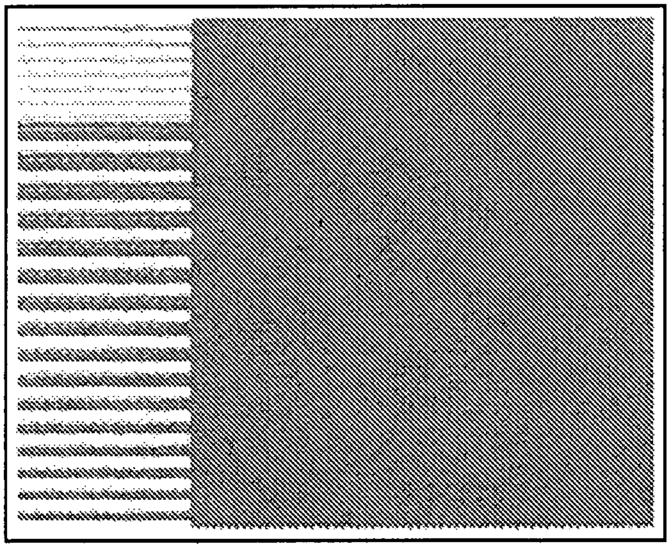

A comparison of images produced from two jet stacks, one with a stainless steel compliant wall and one with a polymer compliant wall, is shown in FIGS. 5A and 5B. The image on the left side having the vertical white strip has a jet failure and resulted from a jet stack having a stainless steel compliant wall. The image on the right resulted from a jet stack having a polymer compliant film and does not show the same failure.

It must be noted that while the above discussion focuses on a jet stack that produces printed images, the application of the embodiments discussed may be implemented into any system having a drop on demand fluid ejector. This includes printers, such as thermal ink jet printers, printheads used in applications such as organic electronic circuits, bioassays, three-dimensional structure building systems, etc. The term 'printhead' is not intended to only apply to printers and no such limitation should be implied. The jet stack generally resides within the printhead of a printer, with the term printer including the examples above.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of manufacturing a fluid dispensing subassembly, comprising:

forming a first structure of at least a diaphragm and a gap plate adjacent to at least one side of a polymer compliant film, the gap plate further including an air gap integrally formed therewithin;

forming a second structure of at least a manifold body sealed on at least one side by the polymer compliant film;

placing the polymer compliant film between the first and second structures; and using the polymer compliant film as an adhesive to attach the first and second structures together, forming a fluid dispensing subassembly.

2. The method of claim 1, wherein the polymer film is arranged so as to seal openings in the manifold body, the openings to provide deflection regions for the polymer compliant film.

3. The method of claim 2, wherein the polymer film is further arranged to one of either cover manifolds in the manifold completely or partially.

4. The method of claim 2, wherein forming a fluid dispensing subassembly comprises using pressure over time to bond the first and second structures to the polymer compliant film.

5. The method of claim 1, wherein forming the first structure comprises forming the first structure from the diaphragm, a body plate, and a spacer.

6. The method of claim 5, wherein forming the second structure comprises forming the second structure from the manifold body, a rock screen plate, an inlet plate and an aperture plate.

7. The method of claim 6, wherein forming the second structure from the manifold body comprising forming the second structure from first and second manifold plates.

8. The method of claim 1, further comprising cutting the polymer compliant film to form ports for at least one of air and ink flow.

9. The method of claim 8, wherein cutting the polymer compliant film comprises using a laser to cut the polymer compliant film.

* * * * *